United States Patent [19]
Fink et al.

[11] 3,950,036
[45] Apr. 13, 1976

[54] METHOD AND APPARATUS TO GENERATE AN ELECTRIC ANTISKID CONTROL SIGNAL FOR AN ANTISKID SYSTEM

[75] Inventors: Werner Fink; Dieter Kircher, both of Frankfurt am Main; Hubertus von Grunberg, Niederhochstadt; Hans-Wilhelm Bleck-Mann, Frankfurt am Main, all of Germany

[73] Assignee: ITT Industries, Inc., New York, N.Y.

[22] Filed: Nov. 6, 1974

[21] Appl. No.: 521,319

Related U.S. Application Data

[63] Continuation-in-part of Ser. No. 412,926, Nov. 5, 1973, abandoned.

[30] Foreign Application Priority Data
Nov. 6, 1972  Germany............................ 2254295

[52] U.S. Cl......................... 303/21 BE; 188/181 C
[51] Int. Cl.².......................................... B60T 8/08
[58] Field of Search............. 188/181 C; 303/20, 21; 307/10 R; 317/5; 324/161; 340/53, 263

[56] References Cited
UNITED STATES PATENTS
3,583,773   6/1971   Steinbrenner et al. ......... 303/21 EB
3,744,851   7/1973   Burckhardt et al............. 303/21 BE
3,768,873   10/1973  Hirzel ............................ 303/21 BE
3,834,770   9/1974   Fleischer et al.................. 303/21 P FOREIGN PATENTS OR APPLICATIONS
2,050,327   4/1972   Germany ........................ 303/21 BE Primary Examiner—Trygve M. Blix
Assistant Examiner—Stephen G. Kunin
Attorney, Agent, or Firm—John T. O'Halloran; Menotti J. Lombardi, Jr.; Alfred C. Hill

[57] ABSTRACT

A method and the apparatus to carry out the method produce an electric antiskid control signal for each braked wheel of a motor vehicle having an antiskid system. A reference value, approximating the vehicle speed, is produced from the output of the speed sensor of each braked wheel. The antiskid control signal for each braked wheel to correct the brake pressure therein is determined by the difference between the reference value and the momentary speed of the associated one of the braked wheels.

8 Claims, 9 Drawing Figures

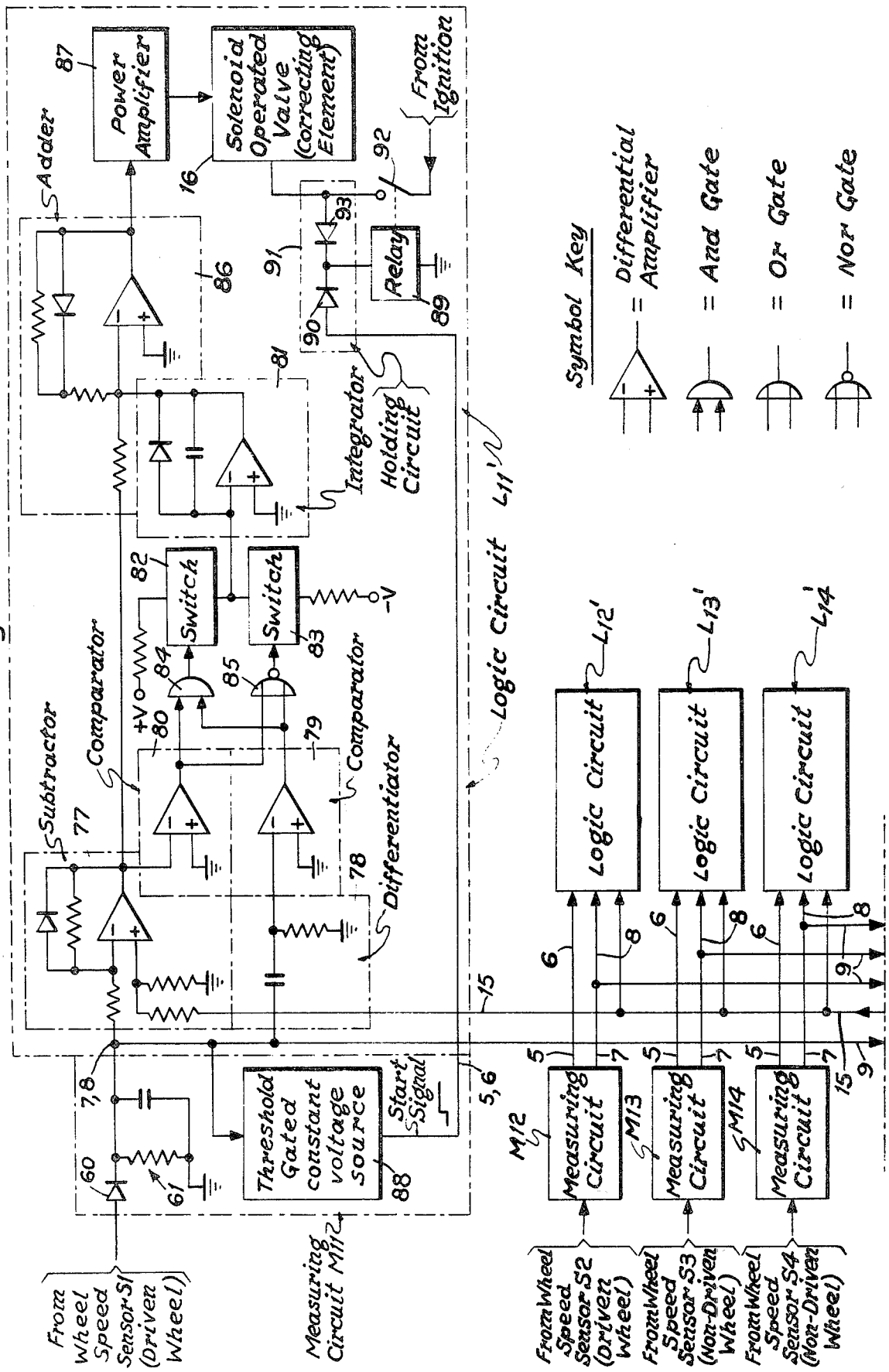

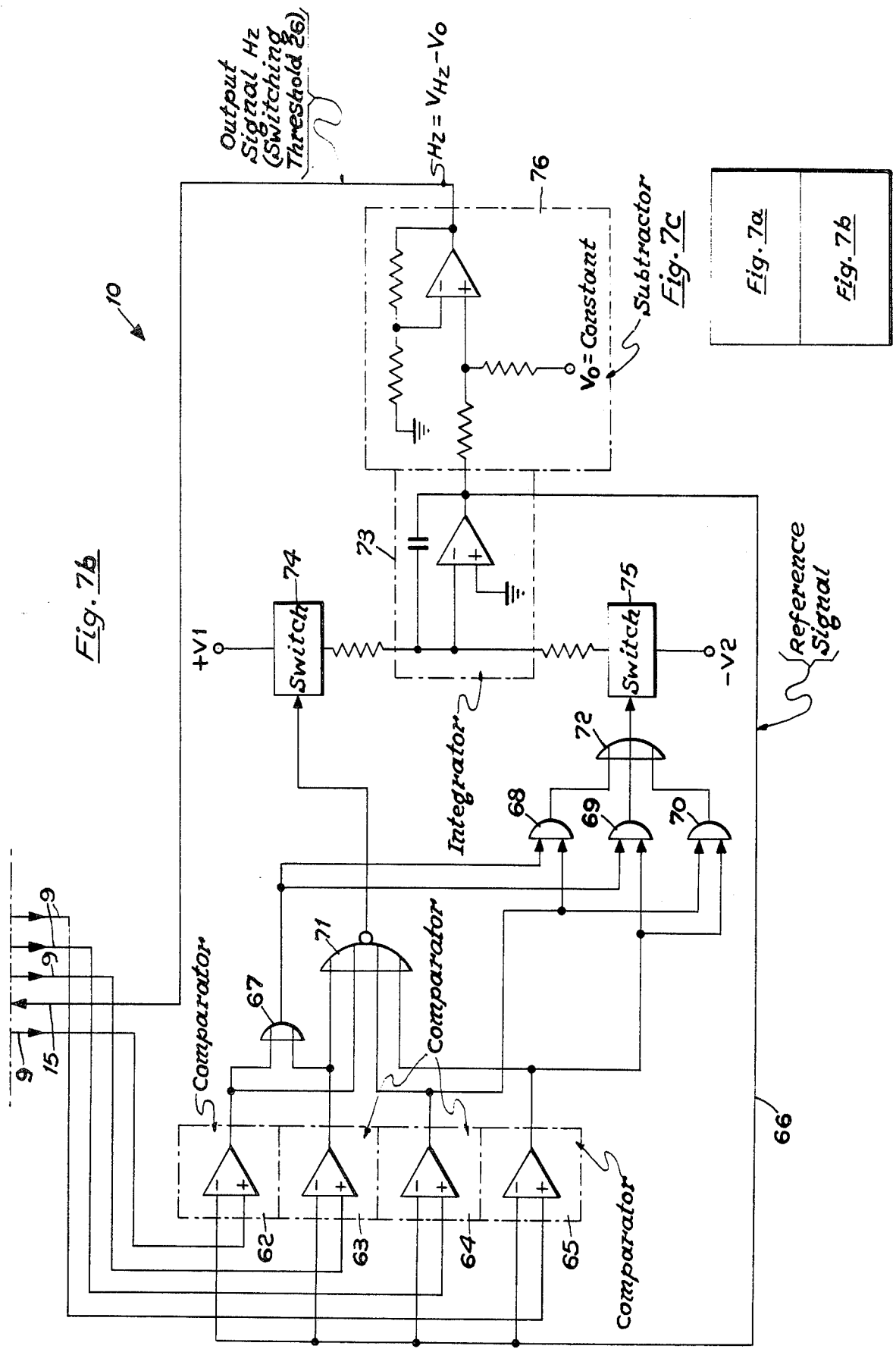

METHOD AND APPARATUS TO GENERATE AN ELECTRIC ANTISKID CONTROL SIGNAL FOR AN ANTISKID SYSTEM

CROSS-REFERENCE TO RELATED APPLICATIONS

This is a continuation-in-part application of our co-pending application Ser. No. 412,926, filed Nov. 5, 1973, now abandoned.

BACKGROUND OF THE INVENTION

This invention relates to a method and apparatus to produce an electric antiskid control signal for each braked wheel of motor vehicles and more particular to such apparatus where a reference value is produced in accordance with the state of motion of each braked wheel and comparing this reference value with the continuously instantaneously measured actual value of the state of motion of each braked wheel to provide a control signal for each braked wheel actuate an associated correcting element for controlling the effective brake pressure at each braked wheel.

Every driver knows the undesired and dangerous attendant circumstances of the locking of all or separate vehicle wheels. When the brake force applied by the driver can no longer be transmitted to the roadway, for example, because of an emergency braking or simply because of a too low frictional value between the tire and the roadway, the respective wheel is locked. This results in an increase in the stopping distance since the friction value between the gliding surfaces decreases more. When the front wheels are locked, the vehicle can no longer be steered, and when the rear wheels are locked, the vehicle can skid. Experienced drivers oppose these actions by braking intermittently, i.e. they apply the brakes and release them again, so that the respective wheel — when the wheel tends to lock when the brakes are applied — is shortly afterwards accelerated again and then it is again braked. In this way the vehicle is prevented from gliding over the roadway without the driver being able to steer the vehicle or that the vehicle will rotate about its vertical axis. However, an optimum braking cannot be reached. The increasing speeds of motor vehicles and the increasing density of traffic have long since rendered an automatic antiskid control necessary for the future. The stopping distance has to be reduced to a minimum, the steering capacity of the vehicle has to be maintained and a breaking away of the vehicle has to be prevented.

It would be ideal if the slip, i.e. the difference between the vehicle speed and the wheel speed, could be made the control signal of a preferably electronically, hydraulically operating antiskid control system.

As is well known the friction value between the roadway and the wheel at first strongly increases with increasing slip, then reaches a maximum at about 10 to 20% slip and then drops more or less abruptly. Apart from the friction between the wheel and the roadway, this maximum is also dependent upon the momentary wheel speed. This has rarely been taken into account in arrangements for an antiskid control system made up to now.

For example, there has been a search for a method of measuring the slip of the vehicle wheels and to hold the slip at a value of 10 to 20% by means of correspondingly controlling the effective brake pressure in order to reach an optimum braking. However, even the measurement of the vehicle speed during the braking process caused considerable difficulties.

With the brake control system described in the German Patent specification No. 2,051,899 laid open for public inspection, the attempt was made to apply this method. Therein it is suggested that to approximate the vehicle speed first the acceleration of the vehicle is presented in the form of an electrical voltage by means of a known inertia acceleration sensor and then integrating this value to determine the vehicle speed. Errors occur with this method and should be corrected by comparing the signal produced by the integration slip with the signal of the speed sensor of a wheel which is intermittingly freely rolling during braking. When there is a difference between these two signals, the signal which is produced by integration will be corrected by the signal of the speed sensor. This signal, representing the speed of the vehicle, is transmitted in the electronic unit to a number of circuits in order to be compared with the signal representing the momentary speed of each of the vehicle wheels and to be processed into a value representing the slip of the associated wheel. If the slip exceeds a certain threshold value, the electronic controller transmits an actuating signal to the correcting element, for example, a solenoid valve, to reduce the effective brake pressure up to the point when the state of motion of the wheel has recovered, i.e. the threshold value is exceeded in the opposite direction. At this point the actuation signal alters its sign and via the correcting element initiates an increase of the brake pressure. This process can be repeated, so that the deceleration of the wheel oscillates in a slip range which is previously determined.

However, this above described arrangement does not solve all the difficulties since during each braking the reference wheel has to be cyclically released so that it can become freely rolling and attain the actual vehicle speed. By releasing the reference wheel the stopping distance certainly cannot be optimally short. Also side forces can occur so that the vehicle can drift to one side. It is also a disadvantage that the reference value for the control of all vehicle wheels is determined by the action of only one single reference wheel. When this reference wheel has, for example, during braking a considerably worse friction value than the other wheels, the reference wheel can lock during its braking and it needs, when it is temporarily released, a longer period of time for rolling to reach the vehicle speed again. Therefore, the period of release, which must not be too long because of the increase of the stopping distance, possible is not sufficient and, thus, an adulteration of the reference signal occurs. Also the inertia acceleration sensor whose integrated output signal represents the basis for the reference signal, is, for instance, on inclinations subject to disturbances which have to be compensated for prior to integration.

Other proposals which use the wheel acceleration as a control value, also can only offer an approach to the actually desired brake course. It should be taken into account that the wheel acceleration is dependent on other factors like speed, friction value and other factors. Disturbances which are caused by bumps in the roadway and oscillations of the vehicle have to be eliminated. In order to reach an approach as good as possible to the desired brake course several acceleration thresholds have to be introduced as switching values.

SUMMARY OF THE INVENTION

It is the object of this invention to provide a method and apparatus to carry out the method for the antiskid control of all vehicle wheels in which in a simple way a reference signal is obtained, continuously supervised and approximated to an ideal value, without the necessity of measuring the vehicle speed, without the necessity of releasing a wheel from braking and without the necessity of providing a freely rolling wheel. The invention should in particular also offer the possibility for a continuous control.

A feature of the present invention is the provision of a method for antiskid control of all braked wheels of a motor vehicle comprising during braking the steps of: generating for each of the wheels a voltage proportional to the speed of an associated one of the wheels; combining in a predetermined manner all of the voltages to produce a reference signal which approaches the vehicle speed and to provide an output signal predeterminedly related to the reference signal; and comparing separately the output signal with each of the voltages to provide a control signal for each of the wheels to control brake pressure in the associated one of the wheels.

Another feature of the present invention is the provision of a circuit arrangement to produce separate antiskid control signals for each of N braked wheels of a motor vehicle comprising: N speed sensors each coupled to a different one of the N wheels, where N is an integer greater than one; N measuring circuits each coupled to a different one of the N sensors to provide a voltage proportional to the speed of the associated one of the N wheels, each of the N measuring circuits having two outputs; a combining circuit having an output and N inputs each coupled to one of the two outputs of a different one of the N measuring circuits, the combining circuit providing an output signal at the output thereof derived from a combination of the voltages produced in the N measuring circuits; N antiskid correcting elements each coupled to a different one of the wheels; and N logic circuits each having an output coupled to an associated one of the N correcting elements and three inputs, a first of the three inputs being coupled to the other of the two outputs of an associated one of the N measuring circuits, a second of the three inputs being coupled to the one of the two outputs of an associated one of the N measuring circuits and a third of the inputs being coupled to the output of the combining circuit, each of the N logic circuits producing a control signal at its output which can be continuously varied to control the associated one of the N correcting elements.

BRIEF DESCRIPTION OF THE DRAWING

Above-mentioned and other features and objects of this invention will become more apparent by reference to the following description taken in conjunction with the accompanying drawing in which:

FIGS. 7a and 7b when arranged as shown in FIG. 7c is a schematic diagram of one implementation of the electronic circuit of FIG. 1b in accordance with the principles of the present invention.

DESCRIPTION OF THE PREFERRED EMBODIMENTS

Figure 1A:
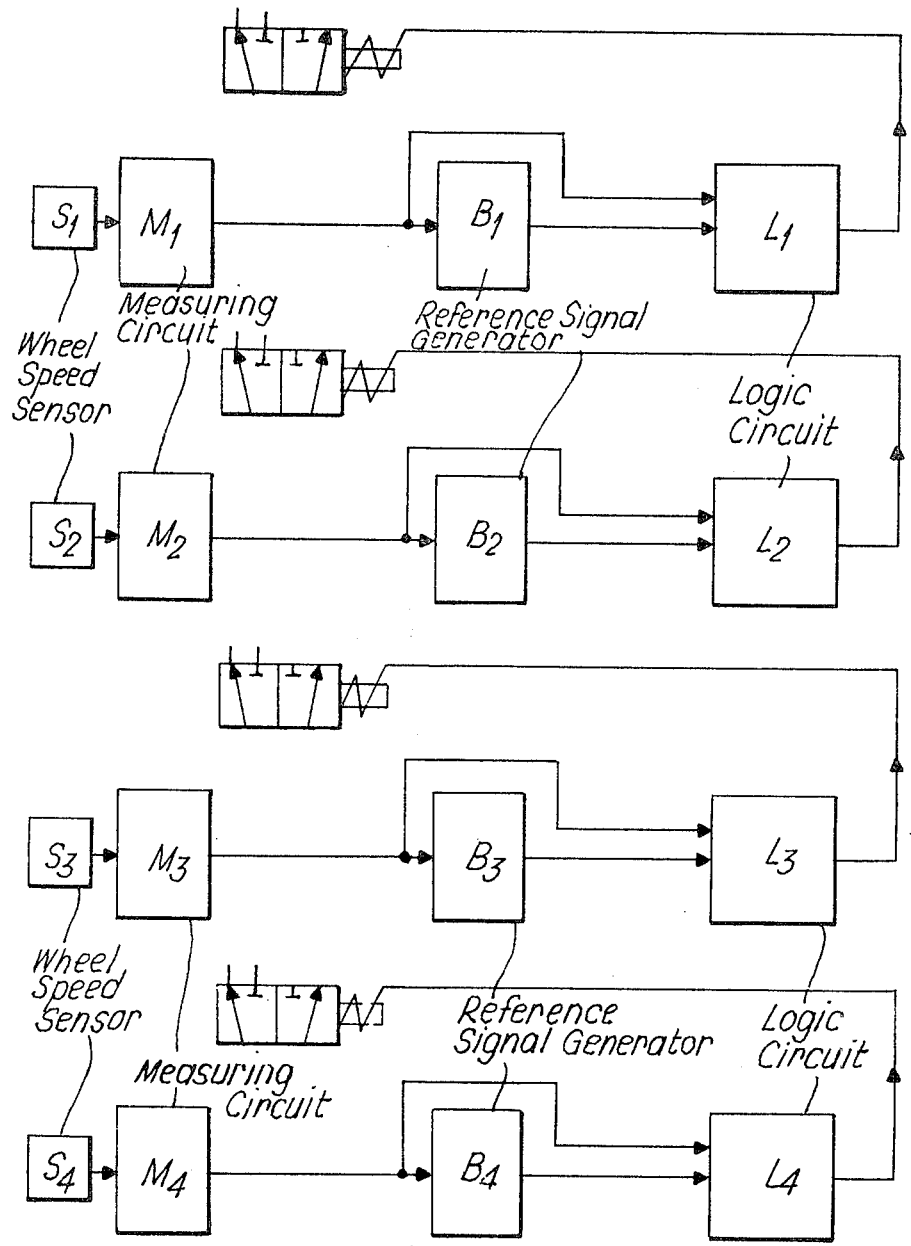
FIG. 1a shows the block diagram of a single wheel control electronic circuit of the prior art for an antiskid control system.

FIG. 1a shows the block circuit diagram of a single wheel control of the prior art, in which there is a separate control circuit for each wheel, with none of these control circuits being interconnected with or dependent upon one another. To each wheel is coupled one of the wheel speed sensors $S_1$, $S_2$, $S_3$ and $S_4$. These wheel speed sensors may take the form as disclosed in U.S. Pat. No. 3,649,871, whose disclosure is incorporated by reference. One of measuring circuits $M_1$, $M_2$, $M_3$ and $M_4$ is coupled to each of the sensors for producing an electric signal representing the state of motion of the associated wheel, preferably the wheel speed. The output signal of measuring circuits $M_1$, $M_2$, $M_3$ and $M_4$ is transmitted, on the one hand, to an associated one of electronic circuits $B_1$, $B_2$, $B_3$ and $B_4$ in which the occurring of a certain measuring signal a reference signal is produced, decreasing at a maximum rate of $-1$ g, and, on the other hand, the output signal is transmitted to the one input of one of the associated logic circuits $L_1$, $L_2$, $L_3$ and $L_4$. At the second input of the logic circuits there is applied the reference signal produced in the associated one of circuits $B_1$, $B_2$, $B_3$ and $B_4$. The logic circuit provides, dependent upon the occurring of and the difference between its two input signals, an actuating signal for coupling to the associated hydraulic correcting element of the antiskid control system for initiating a reduction of the brake pressure when the respective wheel tends to lock, and, thus, initiates a reacceleration of the wheel.

Figure 1B:
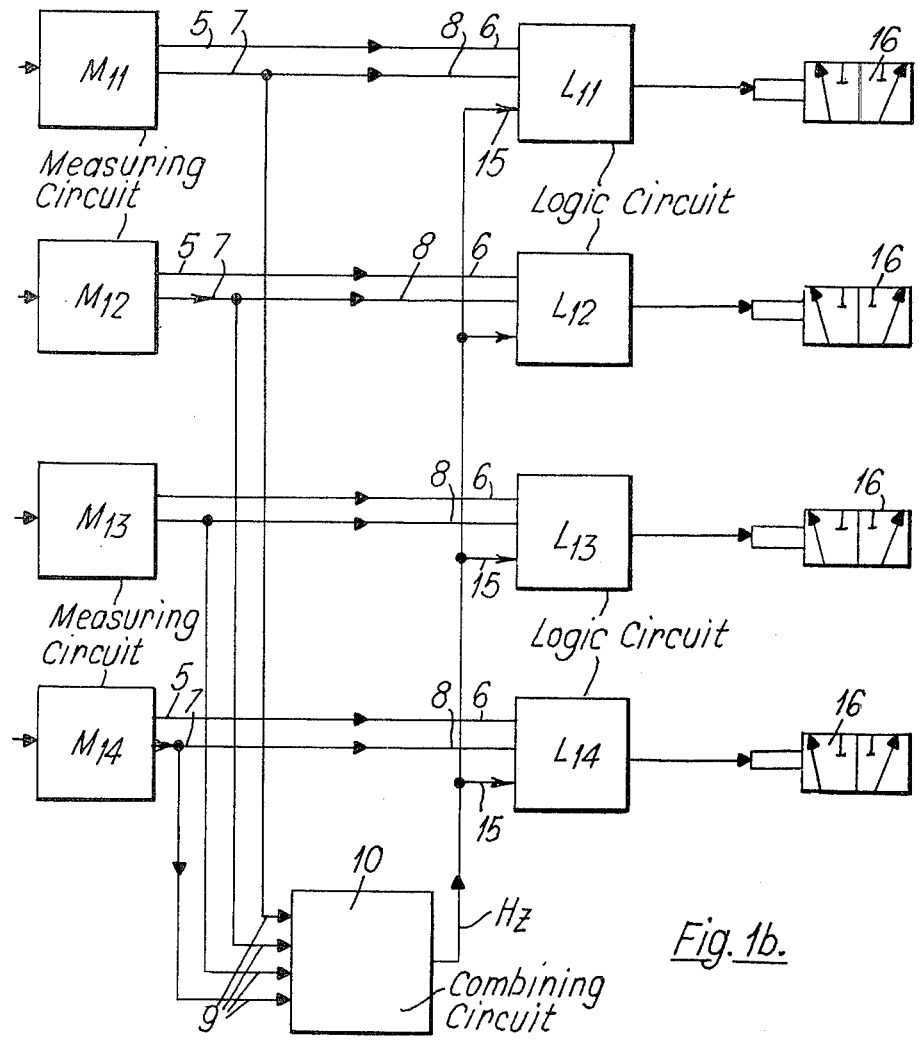
FIG. 1b shows the block diagram of an electronic circuit for an antiskid system in accordance with the principles of the present invention.

FIG. 1b shows the block circuit diagram of the electronic control circuit for an antiskid control system in accordance with the present invention. A wheel speed sensor, which may take the form disclosed in the above cited U.S. Patent, is coupled to each wheel of the vehicle and to an associated one of measuring circuits $M_{11}$, $M_{12}$, $M_{13}$ and $M_{14}$ each of which produces a wheel speed signal. Each of these measuring circuits has two outputs. A constant signal is present at output 5 as soon as the associated wheel has exceeded a low speed limit. This signal is coupled directly to input 6 of the associated one of logic circuits $L_{11}$, $L_{12}$, $L_{13}$ and $L_{14}$ and, thus, initiates the controller output only at this speed threshold. The second output 7 of measuring circuits $M_{11}$, $M_{12}$, $M_{13}$ and $M_{14}$ provides a signal which is proportional to the momentary speed of the associated wheel and which is coupled, on the one hand, directly to the input 8 of the associated one of logic circuits $L_{11}$, $L_{12}$, $L_{13}$ and $L_{14}$ and, on the other hand, to one of the four inputs 9 of a combining circuit 10. In combining circuit 10 a reference signal $H_z$ is produced from the four wheel speed signals coupled thereto, as is described below. Combining circuit 10 provides at its one output reference signal $H_z$. This reference signal is coupled to the third input 15 of logic circuits $L_{11}$, $L_{12}$, $L_{13}$ and $L_{14}$ which by comparing the momentary speed signal of the associated wheel at input 8 with the reference signal at input 15 produces a control signal, which actuates correcting element 16 of the associated control circuit, when the signal at the input 6 indicates that the lower speed limit is exceeded. Here there is also a control circuit for each wheel but in combining circuit 10 a reference signal, which all control circuits have in common, is generated dependent upon the course of the four wheel speeds.

Figure 2:
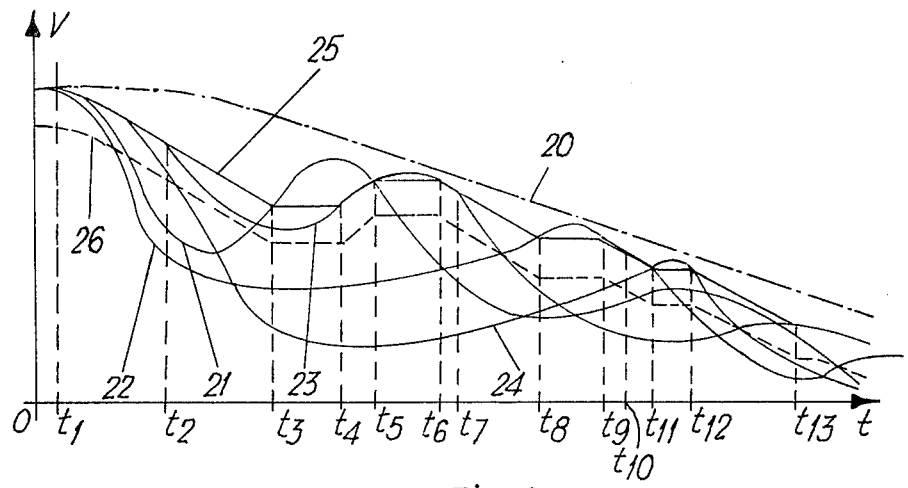
FIG. 2 shows in a speed diagram a first method for producing a reference signal in accordance with the principles of the present invention.

The following describes with the help of FIG. 2 how combining circuit 10 generates the reference signal according to this invention.

The dash-and-dot line 20 in FIG. 2 represents the assumed course with time of the vehicle speed during a braking process. Curves 21, 22, 23, and 24 represent the simultaneous course of the wheel speeds at the four controlled wheels. The wheel speeds will in most cases differ from each other as is shown in FIG. 2. The solid line 25 represents the reference signal.

As has been mentioned above, the wheel speeds are continuously measured by means of a known sensor coupled to subsequent measuring circuit and they are transmitted to the inputs of combining circuit 10 for comparison. Prior to braking the wheel speeds are substantially equal to each other and with the vehicle speed. When braking the vehicle speed diminishes slower than the differently diminishing wheel speeds and at each wheel there occurs an associated slip which must not exceed a certain degree so that a locking will be prevented. The maximum permissible or ideal deceleration of the vehicle is assumed to be $-1g$. This value is, however, not determined as being constant since it is much more favorable when it can be corrected dependent upon the preceding control cycles. Thus, when at a very low frictional value of the roadway, e.g. an icy roadway, a deceleration of $-1g$ may lead to wheel locking. This can be noticed in the controller in the course of the control cycles and the value of the maximum permissible deceleration is automatically decreased by the controller as long as this friction situation continues. The reference signal should, as has already been mentioned, represent an approximation to the vehicle speed. According to this invention reference signal 25 should for this reason follow, with the beginning of the braking process at $t_1$, that wheel which is most slowly decelerated, curve 23, until also this wheel is decelerated at more than $-1g$. Beginning with this moment $t_2$ reference signal 25 further diminishes with the constant negative gradient of $-1g$ and separates from the wheel speed curve 23. All wheels are controlled with reference to this reference signal, i.e., they are released from braking when they overcome a certain difference, then are accelerated and then they will be braked again. The reference signal of $-1g$ or the value corrected in the controller cannot be held constant, however, during the further process of braking, since in most cases the vehicle will not reach the deceleration of $-1g$, the difference between vehicle speed and reference signal and, thus, also the controlled slip would become great and greater and finally a locking would occur nevertheless. Therefore, the reference signal is in the further course either held constant or increased according to the following principles.

When the speed curve 21 of the fastest reaccelerated wheel intersects the reference signal, diminishing at $-1g$, at the moment $t_3$, the reference signal is held constant during the following period of time until the speed curve 23 of the second-fastest reaccelerated wheel at the moment $t_4$ also intersects the reference signal. Then the reference signal follows the ascending speed curve of the second-fastest wheel, i.e., it is approximated to the vehicle speed, until at the moment $t_5$ the speed curve 21 of the fastest wheel, which has been braked again, in descending intersects the reference signal. The still ascending speed curve 23 which was followed by the reference signal until the moment $t_5$ now is the fastest wheel, therefore, the reference signal is held constant until the same speed curve 23 while descending intersects the reference signal again at the moment $t_6$. None of the other wheels has in the meantime reached the reference signal. Thus, the reference signal follows, beginning with the moment $t_6$, the speed curve 23 of the re-decelerated and at the same time fastest wheel until the deceleration of this wheel at the moment $t_7$ becomes greater than $-1g$. Here the reference signal moves away from the speed curve and further descends with the constant negative gradient of $-1g$. At the moment $t_8$ the speed curve 22 of another reaccelerated wheel, which at this moment is the fastest wheel, reaches the reference signal and another holding-constant-phase begins. Here the braking process has continued to the point that two of the controlled wheels are accelerated beyond the reference signal. The descending speed curve 22 intersects the reference signal at the moment $t_9$ again. Since none of the wheel speeds exceeds the reference signal, the reference signal follows the speed curve 22 until $t_{10}$. Here the reference signal moves away from the stronger descending curve and the reference signal further descends with its maximum negative gradient until it is intersected at the moment $t_{11}$ by the ascending speed curve 24 of the now fastest accelerated wheel. Then the reference signal 25 remains constant until it is at the moment $t_{12}$ intersected by the now descending speed curve 24. From this point in time the reference signal descends at $-1g$ until it meets at the moment $t_{13}$ the speed curve 23 of the now fastest wheel. The curve 23 is in its present control cycle already again in its descending, i.e., decelerated phase or just in its maximum. The reference signal 25 from here follows the speed curve of the respective fastest wheel which at this time is towards the end of the braking process and, therefore, no longer reaches a deceleration of $-1g$. As can be seen from the diagram in FIG. 2 the reference signal is a curve including portions periodically descending at a maximum $-1g$ rate, portions periodically being held constant and portions periodically ascending. This reference signal in the course of the braking process deviating less and less from the vehicle speed. According to this invention this reference signal represents the reference value for the wheel control, i.e. when the speed of a wheel diminishes a certain amount below the reference signal, namely, when the speed of a wheel is equal to a deceleration which exceeds a certain amount over $-1g$, or the value corrected in the controller, the control begins. This results in the so-called switching threshold 26, drawn in a dash line in FIG. 2, which accurately follows the reference signal, reduced by the value $\Delta V_1$. An electric value corresponding to this switching threshold 26 is the output signal of combining circuit 10 in FIG. 1b and is coupled to the logic circuits $L_{11}$, $L_{12}$, $L_{13}$ and $L_{14}$ for the comparison with the signal corresponding to the associated wheel speed. When a signal occurs at input 6 the associated logic circuit produces, according to a system described below, a control signal for the correcting element of the control circuit as soon as the value corresponding to the wheel speed decreases below the value of the switching threshold. This control signal can preferably be altered dependent upon the difference of the wheel speed from the switching threshold when the wheel speed is below the switching horizon.

In the method described above it has to be considered that the driven wheels of the vehicle represent a special case since their speed can be increased not only by de-braking but also by the drive, eventually beyond the vehicle speed. There the reference signal must not be increased only by an acceleration only at the driven wheels.

The reference signal is increased:
1. In accordance with the second-fastest wheel when at least one of the two fastest wheels is not driven, and
2. In accordance with the third-fastest wheel when the two fastest wheels are the driven wheels.

The reference signal is held constant when it lies between the speeds of the fastest and the second-fastest wheel.

The reference signal is decreased, with maximum $-1g$, when it lies above the speed of the fastest wheel.

It should be mentioned that the increase of the reference signal may be performed in that it principally follows the speed curve of the reference wheel, but only with maximum $4g - 10g$. This is of importance in case sensor failures occur at two wheels at the same time.

Figure 3:
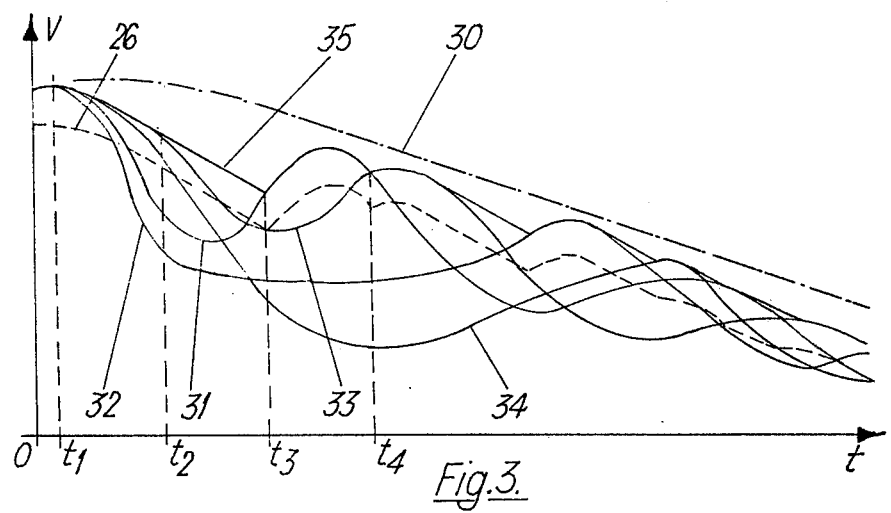
FIG. 3 shows in a speed diagram a second method for producing a reference signal in accordance with the principles of the present invention.

In FIG. 3 is shown another simpler method for producing the reference signal.

The dash-and-dot curve 30 represents the course with respect to time of the vehicle speed, the curves 31, 32, 33 and 34 represent the speed course of the controlled wheels and curve 35 drawn in full represents the reference signal, which is accurately followed by the switching threshold drawn as dash line 36 a distance $\Delta V_1$ from the reference signal.

Here the reference signal principally follows the speed curve of the fastest wheel, however with a maximum negative gradient of $-1g$. This means: with a beginning of braking at $t_1$ the reference signal follows the wheel which is least decelerated until, beginning at the moment $t_2$, also this wheel's speed decreases with more than $-1g$. The reference signal horizon 35 continues to descend at $-1g$ beginning with the moment $t_2$ until it meets at the moment $t_3$ the speed curve 31 of the fastest reaccelerated wheel. From here the reference signal follows the speed curve 31 until this is intersected at the moment $t_4$ by the speed curve 33, i.e., another wheel of the vehicle has become fastest or until the negative gradient of the speed curve which momentary determines the reference signal exceeds $-1g$.

Also in this method the reference signal must not follow the speed curve of an accelerated driven wheel. When the ascending speed curve of a driven wheel intersects the reference signal, the reference signal is held constant until it meets the ascending speed curve of an undriven wheel. The special position of the driven wheels are not shown in FIGS. 2 and 3. When a more accurate approximation of the reference signal to the vehicle speed is desired, a longitudinal acceleration sensor can be built into the vehicle whose output signal is integrated and serves as extropolation of the reference signal, instead of the constant extrapolation at $-1g$.

In the following it is described with the help of FIG. 4 how the control of a separate wheel is performed using the reference signal as the reference value.

In a coordinate system is drawn the course of the wheel speed $V_R$ of a wheel during a control cycle and the pertinent brake pressure course p with respect to time $t$. According to this invention the wheel speed is continuously determined by the measuring circuit with respect to time steps $\Delta T$ and transmitted to the controller. As soon as the wheel speed falls below the switching threshold 26 the controller produces an actuating signal, which can always be altered, to the correcting element which continuously controls the brake pressure dependent upon the determined deviation of the wheel speed from the switching threshold 26 which can be expressed in the mathematical formula $$\Delta p = K_1 \cdot \Delta V_{T-\Delta T} + K_2 \cdot \Delta \Delta V_T + K_3 \ldots (1)$$

$\Delta V$ is the deviation of the wheel speed from the switching threshold 26 and $\Delta \Delta V$ is the alteration of the wheel speed during the time step $\Delta T$ so that another reference value besides the switching threshold results for each control phase. Thus, during the control of the effective brake pressure at every moment T not only the momentary deviation of the wheel speed from the switching horizon is considered but also the tendency of the pregressive deviation. When the wheel speed $V_R$ descends with increasing negative gradient beneath the switching threshold 26, the controller orders a strong diminuation of the effective brake pressure. When in the further process the negative gradient diminishes, the brake pressure is reduced less. To what degree the wheel speed alterations $\Delta V_{T-\Delta T}$ and $\Delta \Delta V_T$ are to control the brake pressure alteratioon $\Delta p$ can be determined and corrected by the constants $K_1$ and $K_2$ in the above-mentioned formula.

Figure 4:
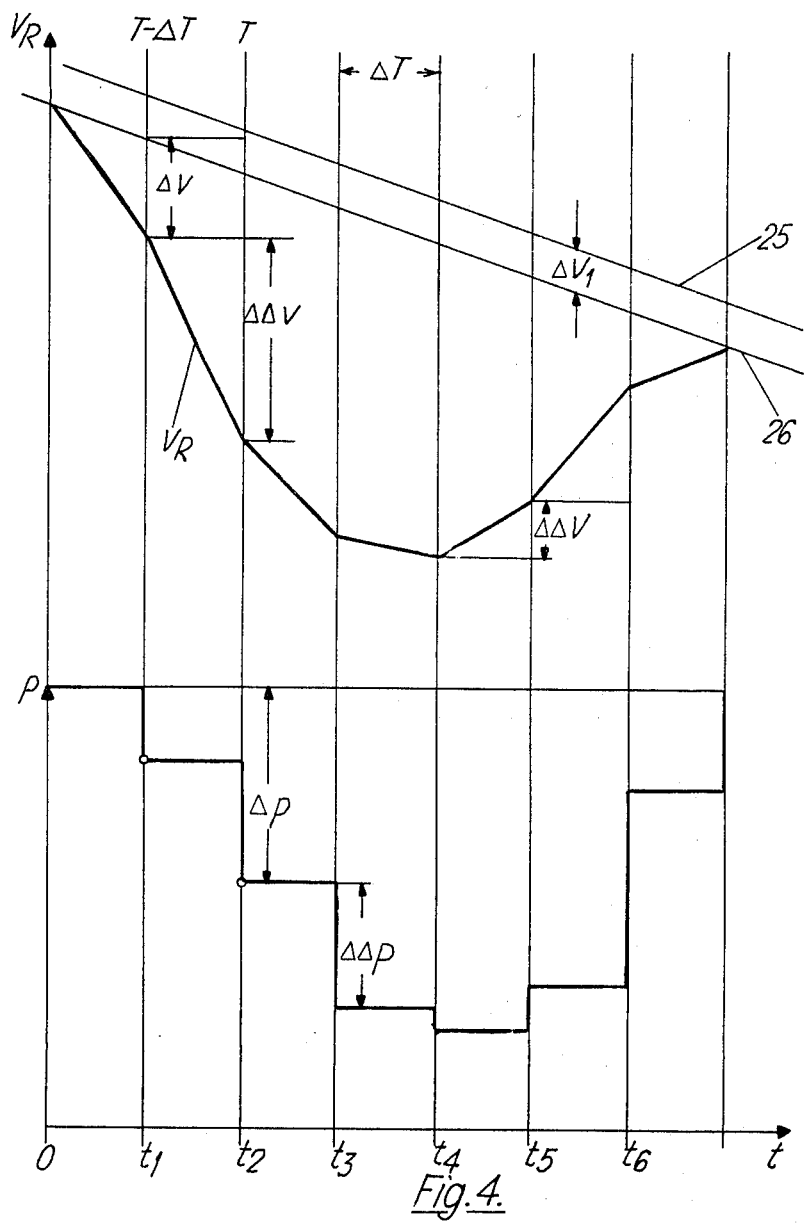
FIG. 4 shows how the reference values are obtained for controlling a single wheel dependent upon the reference signal as well as the pressure course during the braking control.

For FIG. 4 the following constants have been chosen:

$$K_1 = 1; K_2 = 0.5; K_3 = 0$$

The above mentioned formula thus is $$\Delta P = \Delta V_{T-\Delta T} + 0.5 \Delta \Delta V_T$$

At the moment 0 the wheel speed $V_R$ intersects the switching threshold 26 and the control is started. At the moment $T=t_1$ the first term of the formula drops out since at the moment $T-\Delta T = 0$ and the deviation of the wheel speed was 0. Thus, the brake pressure is reduced for the value $\Delta P = 0.5 \Delta \Delta V_{t_1}$ which is directly proportional to the speed alteration $\Delta \Delta V$ between 0 and $t_1$. Already here it can be seen that only a short time of falling below the switching threshold 26, as may be caused by disturbances like bumps in the road, can only cause a comparatively low diminuation of the brake pressure which immediately can be reversed when the wheel speed does not further diminish so that disturbances are automatically eliminated to a large extent. As can be seen, the factor $K_2$ is of utmost importance.

At the moment $T = t_2$ the wheel speed has further diminished with increasing negative gradient. From the speed alteration $\Delta \Delta V$ between $t_1$ and $t_2$ and the deviation of the wheel speed ΔV from the switching horizon 26 at the moment results, according to the formula, an increased pressure reduction which is to counteract the further wheel deceleration. Indeed the wheel speed diminishes towards the moment T — $t_3$ with a considerably lower negative gradient and by the same relationship follows a lesser reduction of the brake pressure $ΔΔ_P$.

During the progressing pressure reduction the state of motion of the wheel recovers again and beginning with the moment T = $t_4$ the wheel speed accelerates again and the brake pressure must be increased again. According to this invention the increase of the brake pressure should be performed with delay while the wheel speed $V_R$ approximates the switching threshold 26. Thus, a too early new deceleration of the wheel is prevented and the wheel speed can with certainty reach a value lying above the switching threshold.

According to this invention this is reached in that while changing the sign of ΔΔV, the constants $K_1$ and $K_2$ alter their values and $K_2$ also alters its sign. For FIG. 4 it has been chosen that $K_1 = 0.5$ and $K_2 = -1$. From the relationship according to the above mentioned formula there results at first a holding-constant-phase between $t_4$ and $t_5$ and subsequently a slower pressure build-up. The distance of the time steps ΔT can be made as small as desired, so that indeed when the speed of the wheel falls below the switching threshold a continuous control begins, with the brake pressure being continuously controlled with a continuous dependence on the speed alteration and with regard to the alteration tendency. Thus, a too strong reduction of the brake pressure in the first phase of the control cycle is prevented without the use of additional thresholds in known threshold control system. The curve of the wheel speed oscillates smoothly about the ideal value and more and more adapts to it.

The above mentioned formula can be further developed as need may be, for example, $ΔV_{t-ΔT}$ could be squared for giving this speed deviation an even higher importance. This does not alter anything in the principle of this invention.

Figure 5:
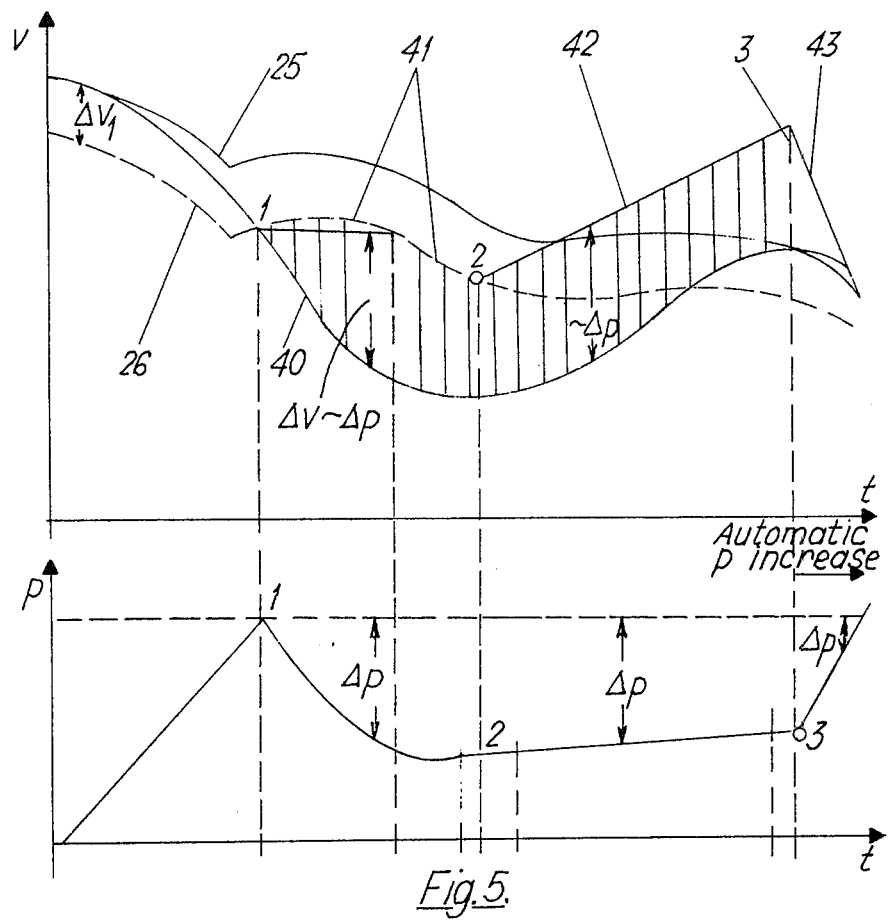
FIG. 5 shows a special case of the control course at a single wheel.

In FIG. 5 is shown how the control of a separate wheel is performed according to another method employing the reference signal produced as described in the method hereinabove.

From the reference signal 25 there is produced for each wheel separately a new system of reference values beginning at the moment in which the speed curve 40 of the associated wheel falls below the switching threshold 26 (point 1 in the speed diagram in FIG. 5). In the example illustrated this point 1 lies in a zone in which the reference signal 25 and thus also the switching threshold 26 perform a short-time increase. The reference line 41 and the electric value corresponding to it, thus are held constant on the level of point 1 until the conformity with the switching threshold 26 is achieved again. From this point the reference line 41 follows the switching threshold 26 up to the point 2 which coincides in time with the minimum of the wheel speed in this control cycle. Beginning with point 1, at which the speed curve 40 has intersected the switching threshold 26, the distance of the speed curve 40 from the reference line 41 is permanently measured. This value is represented in FIG. 5 as ΔV and is a value indicating how much the wheel speed has already decreased too much. Therefore, beginning with point 1 the logic circuit of a control circuit provides a control value to the correcting element, which is in the presented example for simplification reasons directly proportional to ΔV, so that the pressure in the wheel brake is beginning with point 1 reduced for $Δ_p$ in permanent dependence on ΔV (pressure diagram in FIG. 5). Thus, the following formula is valid $Δ_P = K_1 · ΔV$. Every other dependence can be chosen by altering the constants in formula (1).

At point 2 at which the increase of the wheel speed changes its sign, the slowing down pressure reduction is stopped and eventually held constant for a short period. The now beginning pressure increase is performed according to this invention furthermore in dependence of the speed difference ΔV, yet the relation is no longer linear so that a decelerated pressure increase can be achieved at point 3. For achieving this relation a certain value is permanently subtracted from the pressure value which is proportional to the speed alteration and for which value it had to increase in the old dependence. Resulting from this the reference line 42 can be drawn in the speed diagram in FIG. 5 beginning with point 2 with a defined gradient up to point 3. The distance of the speed curve 40 from the reference line 42 is a measure indicating for what value the brake pressure has momentarily reduced as compared to its original value. This results in a weakly increasing holding-constant-phase in the pressure diagram from point 2 up to point 3. When the speed curve 40 approaches the reference signal 25 at point 3. Here the decelerated pressure increase is ended and the brake pressure is with constant increase quickly increased up to its original value at point 1 or until a new control cycle begins. Thus there can be drawn in the speed diagram a reference line 43 beginning with point 3 which constantly decreases until the reference signal 25 is reached. The distance between the reference signal 25 and the reference line 43 is a measure indicating for what value $Δ_P$ the brake pressure is momentarily reduced as compared to its original value.

It has been mentioned above that the first phase of the pressure increase should be performed with delay from point 2 to 3. If this is not the case, if it is increased in linear dependence on the speed increase, the wheel would eventually be already braked before its speed curve had again reached the reference signal, the switching threshold, and the above described control process could not take place and the wheel would lock.

It is, however, also possible that in spite of the decreased pressure increase, for example, due to unfavorable frictional value conditions or due to oscillations at the vehicle, the speed curve of the wheel does not reach the reference signal, the switching threshold This case, shown in FIG. 6 then is handled as follows.

Figure 6:
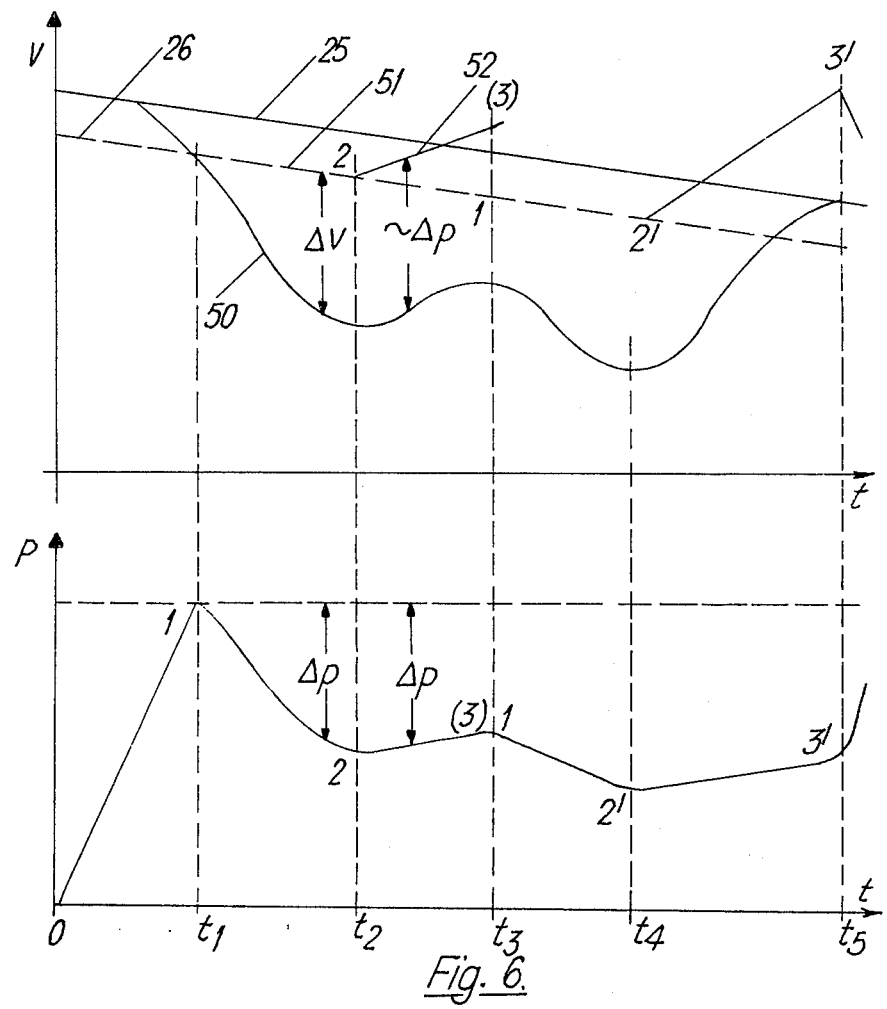
FIG. 6 shows the control of a single wheel with the help of a reference signal and other reference values.

For the sake of simplification in the speed diagram in FIG. 6 the reference signal 25 and the switching threshold 26 are drawn as constantly descending lines (−1g). Beginning with point 1, at which the wheel speed curve 50 intersects the switching threshold 26, the reference line system is produced for this wheel. The reference line 51 for the pressure decrease follows the switching threshold 26 from point 1 up to point 2. In a continuous permanent dependence on the speed difference up to reference line 51, the pressure reduction is performed according to the pressure diagram until the point 2 is reached. From point 2 there results for the decelerated pressure increase the increasing reference line 52, the pressure increase resulting from the speed difference being reduced for a certain value or the constants of the valid formula being changed. In this case at the point 3 it is noticed that the speed curve 50 has not yet reached the reference signal. Therefore, the control process, described with the help of FIG. 5 is interrupted and point 3 is replaced by point 1, i.e., a new pressure reduction, proportional to the further speed decrease follows after the phase of reduced pressure increase.

This can be repeated for several times. During one of the following decelerated pressure increases beginning with point 2', the speed curve 50 reaches the switching threshold 26 and the reference signal 25 so that point 3 can be determined and as described above with respect to FIG. 5 a fast pressure increase occurs until the beginning of the next control cycle.

When in a special case, for example, when the road is icy, the pressure decrease permanently following the speed reduction from point 1 up to pressure 0 is not sufficient for accelerating the wheel again, then the valve, which initiates the pressure reduction is held energized until the wheel is rolling again. Afterwards the decelerated pressure increase from point 2 to point 3 is initiated.

In the method described a reference signal is deduced in an advantageous way, from all wheels of the vehicle, which is again and again approximated to the vehicle speed without the speed itself having to be measured. From this reference signal is for each separate wheel continuously derived a reference line system according to which the brake pressure is controlled in dependence on the speed differences as compared to the reference lines, said dependence being expressed in a formula. Preferably these speed differences are interrogated in time steps of, for example, 5 - 20 msec. (millisecond). There is also the possibility of using the pressure itself as information. By checking the preceding pressure alteration it is possible to make a permanent pressure alteration dependent on the preceding pressure alteration. In this way a smooth pressure course is achieved during the brake control and an extreme pressure reduction is avoided as may easily occur in pure threshold controls.

The description of FIGS. 2 and 3 indicates how the reference signal Hz which is proportional to the speed of the vehicle is generated in combining circuit 10. This reference signal is then presented to logic circuits $L_{11}$ to $L_{14}$ for production of the antiskid control signals for correcting elements 16. The simplest implementation of logic circuits $L_{11}$ to $L_{14}$ would be pure comparators, such as differential amplifiers to compare the reference signal to each of the wheel speed signals. These comparators would then directly produce a control signal proportional to the difference between the wheel speed and the vehicle speed. When this control signal achieves a value indicative of wheel lock, the correcting elements 16 would be activated to reduce the brake pressure at the locking wheel. One possible implementation of measuring circuits $M_{11}$ to $M_{14}$ and combining circuit 10 and the description thereof is set forth hereinbelow with respect to FIGS. 7a and 7b.

An improved method to generate an electric antiskid control signal has been described hereinabove with respect to FIGS. 4 to 6. One implementation to carry out this improved method is illustrated in FIGS. 7a and 7b when arranged as illustrated in FIG. 7c. FIG. 7a illustrates a schematic diagram of measuring circuit $M_{11}$ with measuring circuits $M_{12}$ to $M_{14}$ being identical thereto and a schematic diagram of logic circuit $L_{11'}$ with logic circuits $L_{12'}$ to $L_{14'}$ being identical thereto while FIG. 7b illustrates a schematic diagram of combining circuit 10. The description that follows will be directed to measuring circuit $M_{11'}$ combining circuit 10 and logic ciruit $L_{11'}$ with it being understood that the description of circuit $M_{11}$ and circuit $L_{11'}$ applying equally to circuits $M_{12}$ to $M_{14}$ and circuits $L_{12'}$ to $L_{14'}$ Measuring circuit $M_{11}$ includes a rectifier in the form of diode 60 which rectifies the sine-wave output of wheel speed sensor S1. The output of diode 60 is smoothed by the capacitor-resistor network 61 to provide a direct current voltage proportional to the rotational speed of the associated wheel.

The voltage at the output 7 of each of the measuring circuits $M_{11}$ to $M_{14}$ are coupled by conductors 9 to combining circuit 10 (FIG. 7b). The four comparators 62 to 65 establish whether the rotational speed of the associated wheel is greater or smaller than an instantaneous reference signal present on conductor 66. If the speed is greater, a signal will appear at the output of the appropriate one of comparators 62 to 65 which corresponds to logic 1. The necessity to determine this logic state will be understood when reading, for example, the description of FIG. 2.

OR gate 67, AND gates 68 to 70, NOR gate 71 and OR gate 72 determine the wheel that governs the reference signal. NOR gate 71, which decreases the reference signal when the reference signal is above the speed of the fastest wheel, generates a signal if all the signals of measuring circuits $M_{11}$ to $M_{14}$ have dropped below the reference signal, since in this case no output signal will appear at the output of comparators 62 to 65. If an output signal appears at the output of at least one of comparators 62 to 65, which means that the reference signal is no longer above the speed of the fastest wheel, no such signal will be produced at the output of NOR gate 71.

OR gate 67, AND gates 68 to 70 and OR gate 72 generate a signal to increase the reference signal (1) in accordance with the second-fastest wheel when at least one of the two fastest wheels is not driven, and (2) in accordance with the third-fastest wheel when the two fastest wheels are the driven wheels. From the condition (2) immediately above it becomes apparent that in this case the two driven wheels may be considered as one single wheel. consequently, OR gate 67 will generate only one signal for the two driven wheels for further processing, irrespective of whether an output signal is present for only one or two of these wheels at their associated comparators 62 and 63. It is then determined by means of AND gates 68 to 70 whether for at least two of the wheels an output signal is applied to comparators 62 to 64 to meet the condition (1) immediately above. With regard to the driven wheels, only one signal will be considered so that the condition (2) immediately above is fulfilled. OR gate 72 then combines the output signals of AND gates 68 to 70 so that a signal will be present at the output of OR gate 72 only when the reference signal has to be increased.

The reference signal in formed by a known sweep generator which may include, for example, an integrator 73 which is controllable by switches 74 and 75. By closing switch 75, which is achieved by the output signal of OR gate 72, integrator 73 will be connected to voltage $-V2$ thereby causing integrator 73 output signal, which corresponds to the reference signal to be increased. The voltage $-V2$ is selected in such a way that the increase will be performed with the maximum 4g–10g. If the increase according to the reference wheel is slower switch 75, owing to comparators 62 to 65, OR gate 67, AND gates 68 to 70 and OR gate 72 preceding switch 75, will necessarily operate intermittently, thereby achieving in the average a slower increase of the reference signal.

In accordance with the same principle, the condition that the reference signal must be decreased when it lies above the speed of the fastest wheel will be fulfilled by means of switch 74 controlled by the output signal of NOR gate 71.

The reference signal at the output of integrator 73 is coupled to subtractor 76 which operates to reduce the reference signal by a predetermined constant amount Vo thereby producing the switch threshold 26 (FIGS. 2 to 6) as the output signal $H_z$ according to the principle of the present invention. The switching threshold 26 generated in combining circuit 10 is then coupled to logic circuits $L_{11'}$ to $L_{14'}$. As mentioned above with respect to FIGS. 2 and 3 logic circuits $L_{11'}$ to $L_{14'}$ in their simplest form can be implemented by comparators, such as, for example, differential amplifiers.

The logic circuits $L_{11'}$ to $L_{14'}$ generating the electric antiskid control signals to control correcting elements 16, which is improved by the generation of the switching threshold 26, may be realized, for example, by circuitry which can be implemented by fulfillment of the conditions set forth hereinabove in the description of FIGS. 4 to 6. When observing FIG. 5, for example, and the description thereof it becomes clear that the antiskid control signal at the output of logic circuits $L_{11'}$ to $L_{14'}$ is obtained from the difference between the switching threshold 26 and the wheel speed plus an auxiliary signal generated in accordance with the relevant conditions.

This antiskid control signal is produced by subtractor 77 which generates an output signal equal to the difference between switching threshold 26 and the wheel speed signal at the output of the associated one of measuring circuits $M_{11}$ to $M_{14}$. A differentiator 78 is coupled in parallel to subtractor 77 followed by a comparator 79. Comparator 79 supplies an output signal whenever the modification (change) in the speed of the associated wheel as determined by differentiator 78 is negative, i.e., whenever a deceleration of the associate wheel is sensed. This means that comparator 79 produces an output signal representing the sign of the increase in the speed of the associated wheel.

Comparator 80 connected to the output of subtractor 77 produces a signal if the output signal of subtractor 77 is negative. This means that the speed of the associated wheel is above switching threshold 26.

The above-mentioned auxiliary signal is produced by a controllable sweep generator which may include, for example, integrator 81. Similar to integrator 73 of circuit 10, integrator 81 is controlled by switches 82 and 83 so that the output signal (auxiliary signal) of integrator 81 drops when switch 82 is closed and rises when switch 83 is closed.

Switch 82 is closed by the output signal of AND gate 84 and switch 83 is closed by the output signal of NOR gate 85. The connection of gates 84 and 85 to comparators 79 and 80 as illustrated ensues from the relevant conditions as set forth in the description of FIG. 5.

Adder 86 is coupled to the output of subtractor 77 and the output of integrator 81 and operates to add the auxiliary signal to the difference between switching threshold 26 and the speed of the associated wheel thereby generating the final electric antiskid control signal which is applied, through a power amplifier 87 to the solenoid of the associated one of the brake-pressure control valve, correcting element 16.

As described with respect to FIG. 1b a constant signal or voltage is present at output 5 of each of measuring circuits $M_{11}$ to $M_{14}$ when the speed of the associated wheel has exceeded a low speed limit after the vehicle has started to running. This constant voltage is coupled to input 6 of the associated one of logic circuits $L_{11}$ to $L_{14}$ and, thus, initiates the production of the electric antiskid control signal only at this low speed threshold. FIG. 7a illustrates one way of achieving the foregoing. When the output signal on conductor 7 equals the low speed threshold a threshold gated constant voltage source 88 in the measuring circuit is activated to produce the constant voltage on conductors 5 and 6. This constant voltage activates relay 89 through diode 90, a portion of holding circuit 91. When relay 89 is activated contact 92 is closed and applies the ignition voltage to relay 89 through diode 93 in holding circuit 91 to maintain the coil of relay 89 in the circuit between ground potential and the solenoid of the valve employed as the correcting element 16 thereby providing a closed circuit when the antiskid control signal is applied to element 16 from amplifier 87.

While we have described above the principles of our invention in connection with specific apparatus it is to be more clearly understood that this description is made only by way of example and not as a limitation to the scope of our invention as set forth in the objects thereof and in the accompanying claims.

We claim:

1. A method for antiskid control of all braked wheels of a motor vehicle comprising during braking the steps of:

generating for each of said wheels a voltage proportional to the speed of an associated one of said wheels, each of said voltages having a speed waveform;

combining in a predetermined manner all of said voltages to produce a reference signal which approximates the vehicle speed and to provide an output signal predeterminedly related to said reference signal; and comparing separately said output signal with each of said voltages to provide a control signal for each of said wheels to control brake pressure in the associated one of said wheels;

said step of combining including the steps of determining for each of said wheels speed differences $\Delta V$ and $\Delta \Delta V$ in time steps $\Delta T$ using the speed value of a preceding time step as a reference value when the rotational speed $V_R$ of an associated one of said wheels is lower than said reference signal; and providing as said output signal a switching threshold signal following said reference signal but spaced $\Delta V_1$ below said reference signal.

2. A method according to claim 1, wherein each of said control signals provides a given value of momentary brake pressure reduction $\Delta p$ as compared to the original value of brake pressure in each of said wheels, said given value being determined by the speed differences $\Delta V$ and $\Delta \Delta V$.

3. A method according to claim 2, wherein each of said control signals control the effective brake pressure of the associated one of said wheel in a manner which is dependent upon the speed difference $\Delta\Delta V$ between a measuring point T and a preceding measuring point $T-\Delta T$ and upon the speed difference $\Delta V$ between said preceding measuring point $T-\Delta T$ and said switching threshold signal.

4. A method according to claim 3, wherein
each of said control signals provides a given value of momentary brake pressure reduction $\Delta p$ at the associated one of said wheels, said given value being determined by the mathematical formula $$\Delta p = K_1 \Delta V_{T-\Delta T} + K_2 \Delta\Delta V_T + K_3$$

where $K_1$, $K_2$ and $K_3$ are constants.

5. A method according to claim 4, wherein
the constants $K_1$, $K_2$ and $K_3$ of said formula can be selected to have different values.

6. A method according to claim 5, wherein
when the polarity of $\Delta\Delta V$ of said formula changes, said constants $K_1$, $K_2$ and $K_3$ change their value and said constant $K_2$ also changes its polarity.

7. A circuit arrangement to produce separate antiskid control signals for each of N braked wheels of a motor vehicle comprising:
N speed sensors each coupled to a different one of said N wheels, where N is an integer greater than one;
N measuring circuits each coupled to a different one of said N sensors to provide a voltage proportional to the speed of the associated one of said N wheels, each of said N measuring circuits having two outputs;
a combining circuit having an output and N inputs each coupled to one of said two outputs of a different one of said N measuring circuits, said combining circuit providing an output signal at said output thereof derived from a combination of said voltages produced in said N measuring circuits;
N antiskid correcting elements each coupled to a different one of said wheels; and
N logic circuits each having an output coupled to an associated one of said N correcting elements and three inputs, a first of said three inputs being coupled to the other of said two outputs of an associated one of said N measuring circuits, a second of said three inputs being coupled to said one of said two outputs of an associated one of said N measuring circuits and a third of said inputs being coupled to said output of said combining circuit, each of said N logic circuits producing a control signal at its output which can be continuously varied to control the associated one of said N correcting elements;
the value of said output signal of said combining circuit at first being equal to the highest descending input value of said voltages from said N measuring circuits but having a variable maximum negative gradient and then being equal to a constant value between the highest and second-highest input value of said voltages from said N measuring circuit, said constant value being equal to the value at the intersection of said output signal and said highest input value of said voltages, said constant value remaining constant until the value of said output signal equals the value of the second-highest input value of said voltages;
said combining circuit reducing said output signal by a constant value equal to a given speed change $\Delta V_1$
each of said N logic circuits including
means to determine the difference between said output signal reduced by $\Delta V_1$ and the speed of the associated one of said wheels and the difference of the present speed and the preceeding speed of the associated one of said wheel.

8. A circuit arrangement to produce separate antiskid control signals for each of N braked wheels of a motor vehicle comprising:
N speed sensors each coupled to a different one of said N wheels, where N is an integer greater than one;
N measuring circuits each coupled to a different one of said N sensors to provide a voltage proportional to the speed of the associated one of said N wheels, each of said N measuring circuits having two outputs;
a combining circuit having an output and N inputs each coupled to one of said two outputs of a different one of said N measuring circuits, said combining circuit providing an output signal at said output thereof derived from a combination of said voltages produced in said N measuring circuits;
N antiskid correcting elements each coupled to a different one of said wheels; and
N logic circuits each having an output coupled to an associated one of said N correcting elements and three inputs, a first of said three inputs being coupled to the other of said two outputs of an associated one of said N measuring circuits, a second of said three inputs being coupled to said one of said two outputs of an associated one of said N measuring circuits and a third of said inputs being coupled to said output of said combining circuit, each of said N logic circuits producing a control signal at its output which can be continuously varied to control the associated one of said N correcting elements;
the value of said output signal of said combining circuit at first being equal to the highest descending input value of said voltages from said N measuring circuits but having a variable maximum negative gradient and then being equal to a constant value between the highest and second-highest input value of said voltages from said N measuring circuit, said constant value being equal to the value at the intersection of said output signal and said highest input value of said voltages, said constant value remaining constant until the value of said output signal equals the value of the second-highest input value of said voltages;
said combining circuit reducing said output signal by a constant value equal to a given speed change $\Delta V_1$
each of said N logic circuits including
means to produce said control signal having a value that is varied by the difference of the speed of an associated one of said wheels which in turn is varied by said output signal reduced by $\Delta V_1$, said control signal increasing a given amount during reacceleration of said associated one of said wheels.

* * * * *